United States Patent
Preston

(10) Patent No.: US 6,606,279 B1
(45) Date of Patent: Aug. 12, 2003

(54) SUBMERGENCE DETECTION FOR ELECTRO ACOUSTIC TRANSDUCERS

(75) Inventor: Ashley Preston, Peterborough (CA)

(73) Assignee: Milltronics Ltd., Peterborough (CA)

( * ) Notice: Subject to any disclaimer, the term of this patent is extended or adjusted under 35 U.S.C. 154(b) by 0 days.

(21) Appl. No.: 09/257,492

(22) Filed: Feb. 25, 1999

(30) Foreign Application Priority Data

Feb. 25, 1998 (GB) ................................................ 9804008

(51) Int. Cl.[7] ................................................ G01S 15/02
(52) U.S. Cl. ............................ 367/99; 367/908; 367/98
(58) Field of Search ........................... 367/99, 98, 908, 367/165, 173, 188; 73/290 V; 340/621; 702/103, 48; 141/95

(56) References Cited

FOREIGN PATENT DOCUMENTS

| CA | 1123946 | * | 5/1982 |
| CA | 1292580 | * | 11/1991 |

* cited by examiner

*Primary Examiner*—Daniel T. Pihulic
(74) *Attorney, Agent, or Firm*—Ridout & Maybee

(57) ABSTRACT

A method of detecting actual or incipient submersion of an electroacoustic transducer (2) facing downwardly toward a surface of fluent material to be sensed in a pulse-echo acoustic ranging system, the transducer having a skirt (6) surrounding a downwardly facing radiating surface (4) to maintain an air space (10) beneath the radiating surface even under submergence conditions, and the transducer being electrically energized to emit pulses of acoustic energy from the radiating surface, the system processing an electrical output received from the transducer following a pulse by repeatedly sampling it to obtain a response profile. Samples from an initial portion of the response of the transducer during a ring-down period following the transmit pulse are summed (FIG. 2) in a manner such as to eliminate from the sum portions of each sample due to echo responses above a threshold determined on the basis of preceding samples, and the sum is compared with a predetermined threshold to determine whether submergence is indicated. Typically, the amplitude of each sample is compared with the lowest amplitude sample previously detected, and that lowest amplitude is substituted in the sum for the sample amplitude if lower than the latter.

4 Claims, 1 Drawing Sheet

SUBMERGENCE DETECTION FOR ELECTRO ACOUSTIC TRANSDUCERS

FIELD OF THE INVENTION

Figure 2:
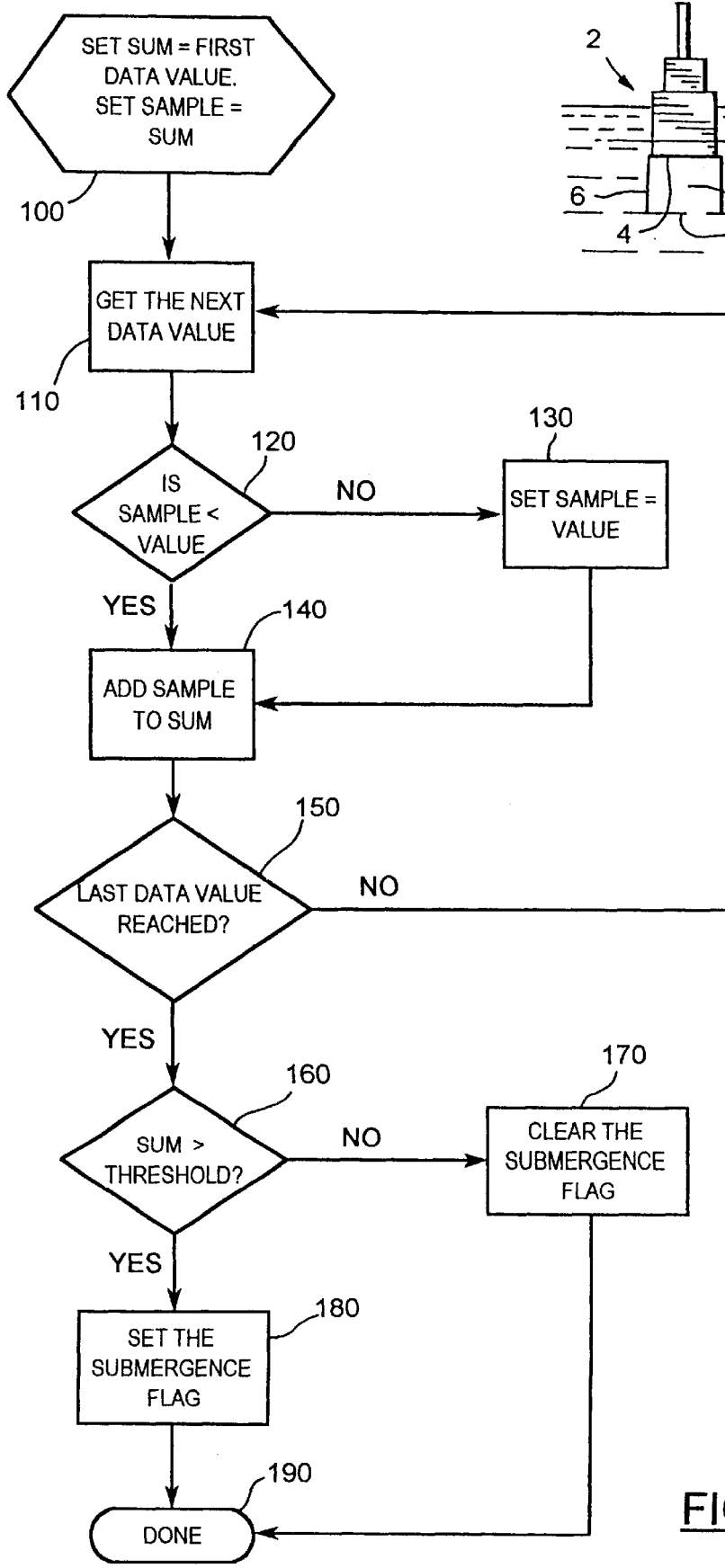

This application relates to acoustic pulse-echo ranging systems similar to those described in our U.S. Pat. No. 4,831,565, issued May 16, 1989.

BACKGROUND OF THE INVENTION

That patent described, inter alia, a technique for determining whether a transducer in such a system is operating normally, by testing the amplitude of the signal received from the transducer a predetermined time after the application of a transmit pulse while the high-Q transducer should still be ringing at high amplitude as a result of the application of the transmit pulse. This technique could theoretically be used to detect whether the transducer is submerged in material whose level it is monitoring, since such submergence will normally severely damp the ringing of the transducer.

Acoustic transducers used in such applications usually have a skirt surrounding a downwardly facing radiating surface of the transducer, which traps air as the transducer becomes submerged. Radiation from the transducer will be reflected backwards and forwards between the surface being ranged and the transducer face with the result that the ringing of the transducer will usually become more sustained as the transducer becomes submerged. This has been used as a means for detecting submersion of the transducer, by detecting whether the initial rate of decrease of the ringing amplitude following a transmit pulse has been slower than a predetermined threshold rate, and/or whether the amplitude of ringing at a predetermined interval after the transmit pulse remains above a preset threshold.

In practice, it is found that these techniques are not always reliable because of substantial variations in the degree of reflectivity of the surfaces that can occur with different materials and circumstances.

SUMMARY OF THE INVENTION

It is an object of the present invention to provide a technique for detecting submergence of transducers which provide more consistent indications, and is less influenced by variations in surface reflectivity.

According to the invention, there is provided a method for detecting actual or incipient submersion of an electroacoustic transducer facing downwardly towards a surface of fluent material to be sensed in a pulse-echo acoustic ranging system, the transducer having a skirt surrounding a downwardly facing radiating surface to maintain an air space beneath the radiating surface even under submergence conditions, and the transducer being electrically energized to emit pulses of acoustic energy from the radiating surface, the system processing an electrical output received from the transducer following a pulse by repeatedly sampling it to obtain a response profile;

wherein samples from an initial portion of the response of the transducer during a ring-down period following the transmit pulse are summed in a manner such as to eliminate from the sum portions of each sample due to echo responses above a threshold determined on the basis of preceding samples, and the sum is compared with predetermined threshold to determine whether submergence is indicated.

Conveniently, the echo response threshold for a sample is an amplitude which if exceeded would produce an upturn in the response profile between successive samples, e.g. a sample larger than the lowest preceding sample will exceed the threshold. Such a summation may be achieved simply by summing successive samples, but substituting the value of each sample, whose value exceeds the lowest sample value previously detected, by that lowest value.

SHORT DESCRIPTION OF THE DRAWINGS

Figure 1:
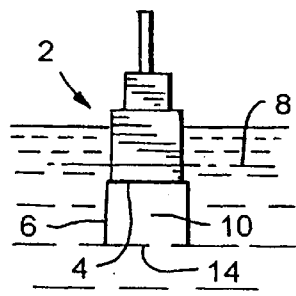

FIG. 1 is a diagrammatic illustration of an electro acoustic transducer head submerged in fluent material whose level it would normally be detecting; and FIG. 2 is a flow diagram of a signal processing routine used to detect an actual or incipient submerged condition of the transducer.

DESCRIPTION OF THE PREFERRED EMBODIMENT

Referring to FIG. 1, an electro-acoustic transducer head 2 comprise a body containing a transducer element coupled to a downwardly facing radiating surface 4, the latter being surrounded by a skirt or hood 6 such that when the head becomes submerged in fluent material 8, such as a liquid or fluent solid, air (this being taken to include any other gaseous medium present above the fluent material) is trapped within the skirt to form an air space 10 which prevents the material from contacting the radiating surface 4.

In use, pulses of acoustic energy, for example 200 microseconds in length and at a frequency of about 44 kHz (these and other quantitative parameters are exemplary and for illustration purposes) are generated by the transducer and radiated by the surface 4 towards a surface 14 of the fluent material opposite the surface 2, whence they are reflected back to the surface 4. Once the transmit pulse is finished, and the ringing level of the transducer has fallen below the saturation level of a receiver (not shown) associated with the transducer, the amplitude of the received signal will represent the sum of the ringing amplitude and energy reflected back into the transducer. During normal operation of the transducer, when a surface 16 of the material is well below the skirt of the transducer, the receiver output following a pulse will exhibit a declining component due to ringing of the transducer, on which is superimposed peaks due to energy received in the form of echoes reflected from the surface 16 of the material, often together with spurious echoes from or via other surfaces. Data from the receiver output below certain minimum range or "blanking distance" is typically discarded, from the point of view of determining the range of the surface 16, as being unlikely to provide reliable results. This blanking distance may for example be about 30 cm, as compared to a skirt depth of about 5 to 8 cm. It is just this data that is used in the present invention. In the embodiment described, it is assumed that data received during a period corresponding to that received during a period taken for sound to traverse twice the blanking distance, e.g. data relating to ranges within the blanking distance, are processed for the purpose of the invention, but it will be appreciated that the blanking distance is a somewhat arbitrary figure. In practice, it is preferred to process data received over a period taken for sound to traverse a distance at least four times the depth of the skirt, and preferably at least eight times the depth of skirt. This corresponds to receipt of at least two and preferably at least four complete echoes from the surface 14 when this is level with the bottom of the skirt. Because of the very short range such echoes will be of high amplitude, although this amplitude will be influenced by the nature of the surface 14 and the condition and properties of the surface 4. These powerful echoes will increase the energy retained in the transducer system and will slow down and usually temporarily halt or reverse the progress of the ring-down. This progress will resume once an echo has been received, but from a higher level than would otherwise have been the case, such that the amplitude of echo samples following an initial echo will be greater than would otherwise be the case.

In order to reduce the influence of variations in surface reflectivity, a special summing technique is applied to samples of the output received from the transducer. Rather than simply determining the average slope of the echo profile during the ring-down period, a summation technique is used which largely removes the influence of varying peak amplitudes. An example of this technique is described with reference to FIG. 2.

Referring to FIG. 2, this shows a flow chart of a data processing routine applied to data received from the receiver associated with the transducer following termination of the transmit pulse. In practice a period will be allowed following termination of the transmit pulse to allow the ringing amplitude of the transducer to drop to a level at which it does not saturate the receiver, since no useful data will be available during this period. In the example considered, this period is about 640 microseconds from the end (840 microseconds from the beginning) of the transmit pulse, corresponding to a sound propagation distance of about 20 cm in air. This means that under submergence conditions, a first echo may be received by the transducer even before processing of samples of the received echo profile begins. This will not influence the effectiveness of the invention, which depends on reducing the effect of peak echo amplitudes occurring in samples actually processed, although sample amplitudes during processing may be increased by energy returned to the transducer by a previous echo. In practical terms data will be processed for the purposes of the invention during a period starting sufficiently long after the transmit pulse for any saturation of the receiver to have ceased and will continue for long enough for at least two echoes, and preferably at least four echoes to have been received by the transducer under submergence conditions. Normally, the period will not continue beyond the end of the blanking period since by then the ring down and the intensity of the echoes will have dropped off considerably.

The routine operates on three variables, Value which is the amplitude of successive samples of the received signal, Sum which is the sum generated by the routine, and Sample which is the smallest Value received by the routine.

In step 100, both Sum and Sample are set equal to the initial Value. In step 110, the next Value is obtained and compared in step 120 with Sample to determine whether Sample is less than Value. If not, Sample is set equal to Value in step 130 before being added to Sum in step 140. Unless the last Value has been reached at the end of the test period, the routine branches at 150 back to step 110.

If the last Value has been reached, the Sum is compared with a predetermined threshold at step 160 to determine whether it exceeds it. If not, a Submergence flag is cleared, if set, at step 170, and the routine exits at 190. Otherwise, the Submergence flag is set at 180 to indicate submergence of the transducer, and the routine again exits. The submersion flag may be used to trigger an alarm signal.

In order to quantify the threshold used at step 160, empirical tests are made with transducers of the type used under submerged and non-submerged conditions in the material whose level is to be monitored, for example water, in order to arrive at a threshold which most reliably distinguishes between submerged and non-submerged transducers. This threshold can then be programmed as a parameter in a control program for the acoustic ranging system of which the transducer forms part. This threshold usually need only be determined once for each type of transducer and each type of material being sensed, although particular applications may need custom tests to ascertain the optimum threshold.

The routine described simply compares the magnitude of Sample and Value. It would of course be possible to apply a multiplier factor above or below unity to one of these parameters before the comparison so as to slope the level at which echo peaks are truncated, if this complication were justified by improved submergence detection; or to use an alternative algorithm to detect echoes and reduce the effect of echo magnitude on the results obtained.

What is claimed is:

1. A method of detecting actual or incipient submersion of an electro-acoustic transducer facing downwardly toward a surface of fluent material to be sensed in a pulse-echo acoustic ranging system, the transducer having a skirt surrounding a downwardly facing radiating surface to maintain an air space beneath the radiating surface even under submergence conditions, and the transducer being electrically energized to emit pulses of acoustic energy from the radiating surface, the system processing an electrical output received from the transducer following a pulse by repeatedly sampling it to obtain a response profile;

wherein samples from an initial portion of the response of the transducer during a ring-down period following the transmit pulse are summed in a manner such as to eliminate from the sum portions of each sample due to echo responses above a threshold determined on the basis of preceding samples, and the sum is compared with a predetermined threshold to determine whether submergence is indicated.

2. A method according to claim 1, wherein the amplitude of each sample is compared with the lowest amplitude sample previously detected, and that lowest amplitude is substituted in the sum for the sample amplitude if lower than the latter.

3. A method according to claim 1, wherein the initial portion of the response is selected to include at least two echoes from the radiating surface when the transducer is submerged.

4. A method according to claim 1, wherein the initial portion of the response is selected to include at least four echoes from the radiating surface when the transducer is submerged.

* * * * *